United States Patent
Bensalem et al.

[11] Patent Number: 5,927,288
[45] Date of Patent: Jul. 27, 1999

[54] HYDROMAGNESITE/MAGNESIUM HYDROXIDE FILLERS FOR SMOKING ARTICLE WRAPPERS AND METHODS FOR MAKING SAME

[75] Inventors: Azzedine Bensalem, Brooklyn, N.Y.; Warren Chang, Taipei County, Taiwan; Jay A Fournier, Richmond, Va.; Andrew G. Kallianos, Asheville, N.C.; John B. Paine, III, Midlothian; Kenneth F. Podraza, Richmond, both of Va.; Donald M. Schleich, Carquefou, France; Jeffrey I. Seeman, Richmond, Va.

[73] Assignee: Philip Morris Incorporated, New York, N.Y.

[21] Appl. No.: 08/823,402

[22] Filed: Mar. 24, 1997

[51] Int. Cl.[6] .......................................... A24D 1/02
[52] U.S. Cl. ........................ 131/365; 131/358; 423/165; 423/159; 423/430
[58] Field of Search ................... 131/365, 358; 423/165, 159, 430; 162/8, 139

[56] References Cited

U.S. PATENT DOCUMENTS

| | | | |
|---|---|---|---|
| 935,418 | 9/1909 | Sisson | 423/165 |
| 1,361,324 | 12/1920 | Grunwald | 423/159 |
| 1,971,909 | 8/1934 | Greider | 423/430 |
| 2,549,408 | 4/1951 | Atchison . | |
| 2,673,565 | 3/1954 | Schur et al. . | |
| 2,801,636 | 8/1957 | Pfoh . | |
| 4,231,377 | 11/1980 | Cline et al. . | |
| 4,420,002 | 12/1983 | Cline . | |
| 4,433,697 | 2/1984 | Cline et al. | 131/365 |
| 4,450,847 | 5/1984 | Owens | 131/365 |
| 4,561,454 | 12/1985 | Guess . | |
| 4,805,644 | 2/1989 | Hampl, Jr. et al. . | |
| 4,881,557 | 11/1989 | Martin | 131/365 |
| 4,915,118 | 4/1990 | Kaufman et al. | 131/365 |
| 4,941,485 | 7/1990 | Perfetti et al. | 131/365 |
| 4,984,589 | 1/1991 | Riedesser . | |
| 5,121,759 | 6/1992 | Dixit et al. | 131/365 |
| 5,131,416 | 7/1992 | Gentry | 131/365 |
| 5,220,930 | 6/1993 | Gentry . | |
| 5,228,463 | 7/1993 | Fournier et al. | 131/365 |

FOREIGN PATENT DOCUMENTS

| | | |
|---|---|---|
| 0404580 | 12/1990 | European Pat. Off. . |
| 544907 | 5/1942 | United Kingdom . |
| 548197 | 9/1942 | United Kingdom . |
| 1289766 | 9/1972 | United Kingdom . |
| 2160084 | 12/1985 | United Kingdom . |

OTHER PUBLICATIONS

Menzel et al. Studien An Kohlensauren Magnesiumsalzen. I. Basische Magnesiumcarbonate. Z. Electrochem. 1930.

Doelter et al. Weitere vorläufige Mitteilungen über Arbeiten auf dem Grenzgebiete zwischen Kolloidchemie, Mineralogie und Geologie. Z. Ch. Ind. Koll. 1909.

L. Walter–Levy Contribution à l'ètude de la double décomposition entre les solutions de sulfate de magnésium et de carbonate de potassium, à l'bullition Séance du 1936.

L.Walter–Levy Carbonates basiques de magnésium. Acadénue Des Sciences 1935.

Berak et al. Wplyw weglanu na stopien dyspersji oraz zachowanie termiczne wytracanego wodorotlenku magnezowego Przemysl Chemiczny 1960.

(List continued on next page.)

Primary Examiner—Mickey Yu
Assistant Examiner—Kelly O'Hara
Attorney, Agent, or Firm—James T. Moore; James E. Schardt; Charles E. B. Glenn

[57] ABSTRACT

Hydromagnesite-magnesium hydroxide compositions are prepared which, when used as fillers in smoking article wrappers, significantly reduce the amount of sidestream smoke produced by the burning smoking article while providing the smoking article with good subjective characteristics.

38 Claims, 10 Drawing Sheets

OTHER PUBLICATIONS

Etude sur les Carbonates de Magnésie: pp. 1021–1022; 1065–1069; 1114–1118 La Papeterie 1920.

Brausser A Propos Des Propriétés De L'Eitelite $Na_2Mg(CO_3)_2$ Bulletin de la Société Royale 1967.

Frankis et al. Subsolidus Relations in the System $Na_2CO_3$—$CaCo_3$—$H_2O$ Nature Physical Science 1973.

McKie Subsolidus phase relations in the system $K_2Ca(CO_3)_2$—$NaMg(CO_3)_2$ at 1 kbar: The fairchildite$_{ss}$–buetschliite–eitelite eutectoid American Mineralogist 1990.

Deelman Low–temperature synthesis of eitelite, $Na_2CO_3.MgCO_3$ N. Jb. Miner. Mn. 1984.

Pabst The Cystallography and Structure of Eitelite, $Na_2Mg(CO_3)_2$ American Mineralogist 1955.

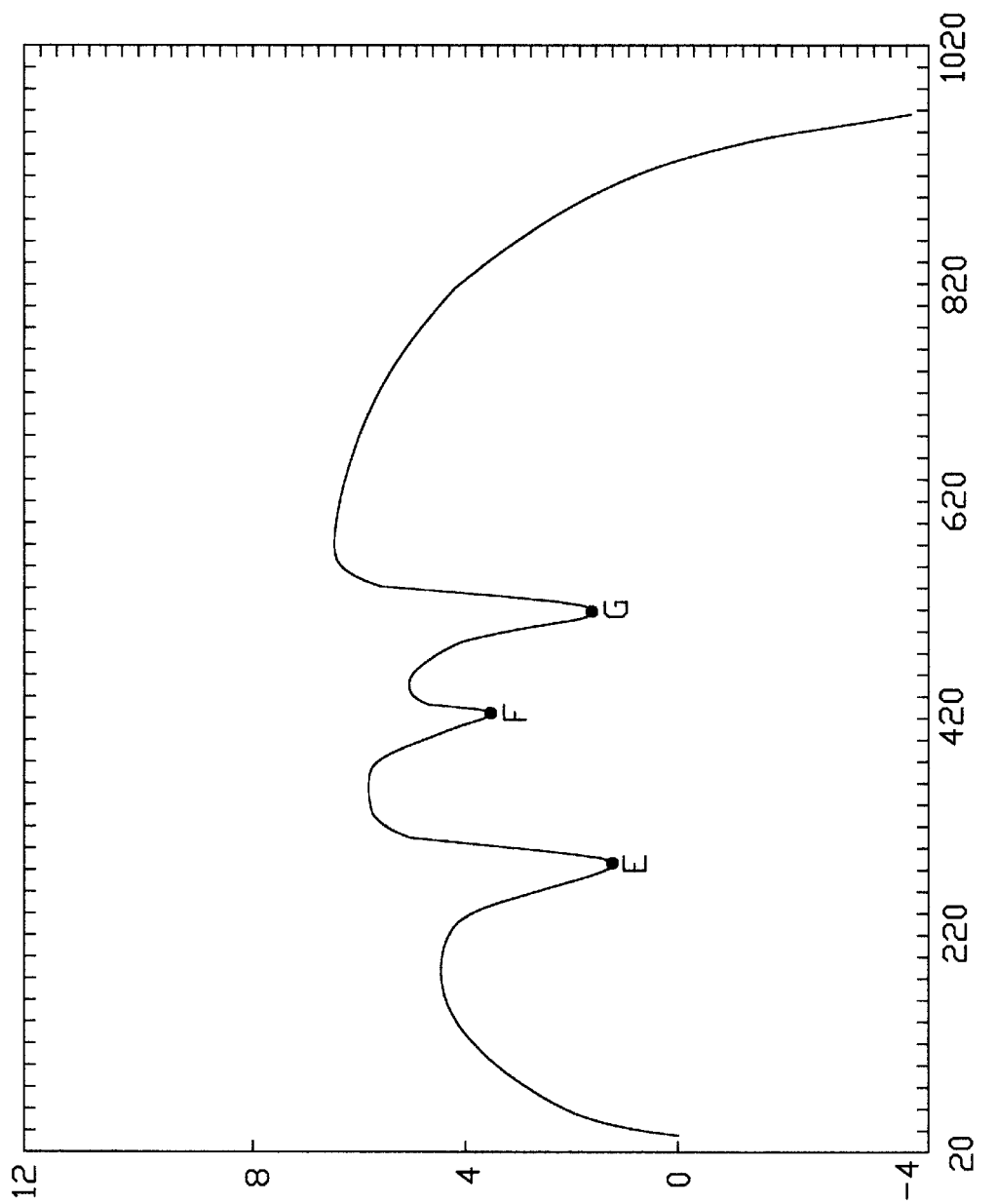

HYDROMAGNESITE/MAGNESIUM HYDROXIDE FILLERS FOR SMOKING ARTICLE WRAPPERS AND METHODS FOR MAKING SAME

I. BACKGROUND

A. Field of the Invention

The present invention relates to novel fillers for smoking article wrappers, and to processes for making them.

B. Description of the Prior Art

Sidestream smoke is the smoke given off by the burning end of a cigarette or a cigarette-like smoking article between puffs. Such smoke may be objectionable to some near the smoker who are not smoking or who do not smoke. Therefore, cigarettes that produce less sidestream smoke are highly desirable.

Several attempts have been made to reduce sidestream smoke through the use of various compounds as fillers for smoking article wrappers. For example, magnesium hydroxide and magnesium oxide have been reported to reduce sidestream smoke in cigarettes, as disclosed in U.S. Pat. Nos. 5,131,416, 4,941,485, 4,915,118, 4,881,557, 4,433,697, and 4,231,377. Some smokers find that cigarettes made with wrappers containing these compounds have an unacceptably poor taste.

Others have tried colloidal solutions of magnesium hydroxide, e.g. as disclosed by U.S. Pat. No. 4,450,847. Again, while magnesium hydroxide reduces the amount of sidestream smoke, its incorporation into smoking article wrappers often results in a cigarette with unacceptably poor taste.

Some have used physical mixtures of magnesium hydroxide or an unspecified "magnesium carbonate" composition with other compounds such as calcium carbonate in smoking article wrappers without solving the poor taste problem, as in U.S. Pat. No. 4,984,589.

Various grades of commercial basic magnesium carbonate, the standard industrial name for hydromagnesite, $[Mg_5(CO_3)_4(OH)_2(4H_2O]$, have been disclosed as the inorganic filler in cigarette papers to produce cigarettes having reduced sidestream smoke. One such example is U.S. Pat. No. 5,121,759. However, there is no teaching or suggestion in this disclosure regarding the particle size or morphology of the basic magnesium carbonates used. Generally, commercial basic magnesium carbonate (hydromagnesite) had been known for the manufacture of cigarette papers resulting in cigarettes with improved ash characteristics. See *Papeterie,* 1920, 42, 1021–1, 1065–9, and 1114–8; *Chem. Abstr.* 15, 1074[4]. Some have even tried flavoring agents to mask the poor taste.

However, none of these attempts to reduce the amount of sidestream smoke while maintaining positive subjective taste attributes have met with success.

The preparative chemistry and stability/reactivity of magnesium oxide, magnesium hydroxide, and the various carbonates of magnesium are very rich and very complicated in terms of stability fields and their characteristics of chemical transformations. As is the case for chemistry in general, a particular reaction can result in the formation of either the thermodynamically stable product(s), or kinetically controlled product(s), or various mixtures of products. In addition, solid products can be obtained in various particle sizes and morphologies. The chemistry described herein is complicated because one must consider all of the following: kinetic and thermodynamic stability; stability fields in terms of temperature, pressure, and concentration of materials; heterogeneous reaction conditions, which impact the formation and location of nucleation sites and crystallization characteristics; and the like.

Many references detail the production of synthetic basic magnesium carbonate (hydromagnesite $[Mg_5(CO_3)_4(OH)_2.4H_2O]$), including U.S. Pat. Nos. 1,971,909, 1,361,324, 935,418; British Pat. Nos. 548,197 and 544,907; See also *Z. Kst.,* 1910, 47, 118 and *Z. Ch. Ind. Koll.* 1909, 4, 189.) In these cases, aqueous solutions of magnesium bicarbonate $[Mg(HCO_3)_2]$ were formed, typically incorporating a carbonation step, and then transformed by the action of base, e.g., magnesium hydroxide, to form basic magnesium carbonate. However, none of these attempts attempted, reported, or asserted the formation of compositions containing both hydromagnesite and magnesium hydroxide. In addition, none of these attempts specified examining various reaction conditions and varying molar ratios of carbon dioxide and other starting materials to form specific compositions containing both hydromagnesite and magnesium hydroxide. In addition, none of these attempts described any effort to modify morphology and obtain material sharing specific particle sizes and agglomerate sizes.

Nesquehonite ($MgCO_3.3H_2O$) was formed by passing a 2–3% solution of magnesium bicarbonate through a series of tanks at about 38° C. while magnesium oxide was added to the last tank, as disclosed in U.S. Pat. No. 2,549,408.

Hydromagnesite and magnesium hydroxide were obtained in the reaction of a soluble magnesium salt at relatively low temperatures by excess potassium carbonate or by potassium carbonate/potassium hydroxide. In this case, the initially formed precipitate is amorphous and later becomes crystalline, as described in H. Menzel and A. Brueckner, *Z. Electrochem.,* 1930, 36, 63–87. If a magnesium-potassium mixed carbonate is used in the reaction, the products contain phases having both magnesium and potassium. (See L. Walter-Levy, *Compt. rend.* 1935, 200, 1940–1942.)

In another case, basic magnesium carbonate is treated with sodium hydroxide to yield pure magnesium hydroxide. (See Brit. Pat. No. 547,769.) The double decomposition of solutions of magnesium sulfate and potassium carbonate at the boiling point result in the formation of various double carbonates. (See L. Walter-Levy, *Compt. rend.* 1936, 203, 879–891.)

Mixtures containing various proportions of magnesium hydroxide, magnesite, and basic magnesium carbonate were prepared by the precipitation from a solution of magnesium sulfate with a mixture of solutions of sodium hydroxide and sodium carbonate. (See J. Berak, R. Guczalski, J. Wojcik and S. Zalwert, *Przemysl Chem.* 1960, 39, 298–300.)

A co-crystalline composition of magnesite and brucite, useful as a finer in a smoking article wrapper, and designed to reduce sidestream smoke without compromising subjective taste attributes, is described in commonly assigned U.S. Pat. No. 5,228,463.

Nonetheless, the search has continued for novel fillers for smoking article wrappers designed to reduce sidestream smoke without adversely affecting the consumer's subjective taste perception of the smoking article. The present invention was made as a result of that search.

C. Objects of the Invention

Accordingly, a primary object of this invention is to provide a smoking article and paper wrapper designed to reduce sidestream smoke without adversely affecting the consumer's subjective taste perception of the smoking article.

Another object of this invention is to develop compositions which can be used in a conventional papermaking process as filler material, either by itself or in a mixture with other filler materials such as calcium carbonate, along with natural plant fibers, the total mixture having rapid filtration capabilities.

Another object of the present invention is to provide processes for preparing compositions that are useful as fillers for fabrication of cigarette papers.

D. Summary of the Invention

In accordance with one aspect of the present invention, a process is provided for preparing an inorganic magnesium composition comprising the steps of:

(A) forming a first solution by one of the following:
   (i) mixing magnesium hydroxide, magnesium oxide, or a combination thereof, with water to form an aqueous suspension and reacting the suspension with carbon dioxide;
   (ii) reacting carbon dioxide with an aqueous suspension of at least one magnesium carbonate such as hydromagnesite, nesquehonite, lansfordite, dypingite, or georgiosite;
   (iii) reacting a water-soluble magnesium salt with an alkali metal bicarbonate in water to form an aqueous solution;

(B) heating the solution from step (A) to 45–55° C. in the continued presence of carbon dioxide to form a second solution; and (C) adding an aqueous solution of an alkali base to the solution from step (B), and stirring the resulting mixture for an additional 4–8 hours at 80–90° C. to form a precipitate.

In accordance with another aspect of the present invention, steps (A) (i), (A) (ii) and (A) (iii) further comprise adding a water soluble magnesium salt such as magnesium acetate to the aqueous medium, preferably after the addition of the carbon dioxide.

In accordance with another aspect of the present invention, the filler for use in cigarette paper wrapper for a cigarette article comprising a magnesium carbonate hydroxide composition is produced by this process.

In accordance with another aspect of the present invention, a process is provided for preparing a magnesium carbonate hydroxide composition comprising the steps:

(a) mixing hydromagnesite with water to form a suspension;

(b) reacting the suspension from step (a) with carbon dioxide to form a first solution;

(c) reacting the solution from step (b) with magnesium acetate to form a second solution; and (d) adding an aqueous base solution to the solution from step (c) and heating the resultant mixture at or above 50(C to form a precipitate.

In accordance with another aspect of the present invention, a paper wrapper for a cigarette article is provided comprising plant fibers and a filler produced by the process of the present invention.

These and other objects, aspects and advantages of the present invention will become apparent from the following description.

III. BRIEF DESCRIPTION OF THE DRAWINGS

FIGS. 1a, 1b, and 1c are thermal decomposition plots for the material produced in Example VI. FIG. 1a is thermogravimatric analysis (TG); FIG. 1b is differential thermogravimetric analysis (DTG), and FIG. 1c is differential thermal analysis (DTA).

FIGS. 2a, 2b, and 2c are thermal decomposition plots for the material produced in Example VII. FIG. 2a is TG analysis; FIG. 2b is DTG analysis, and FIG. 2c is DTA.

IV. DETAILED DESCRIPTION

Figure 1A:
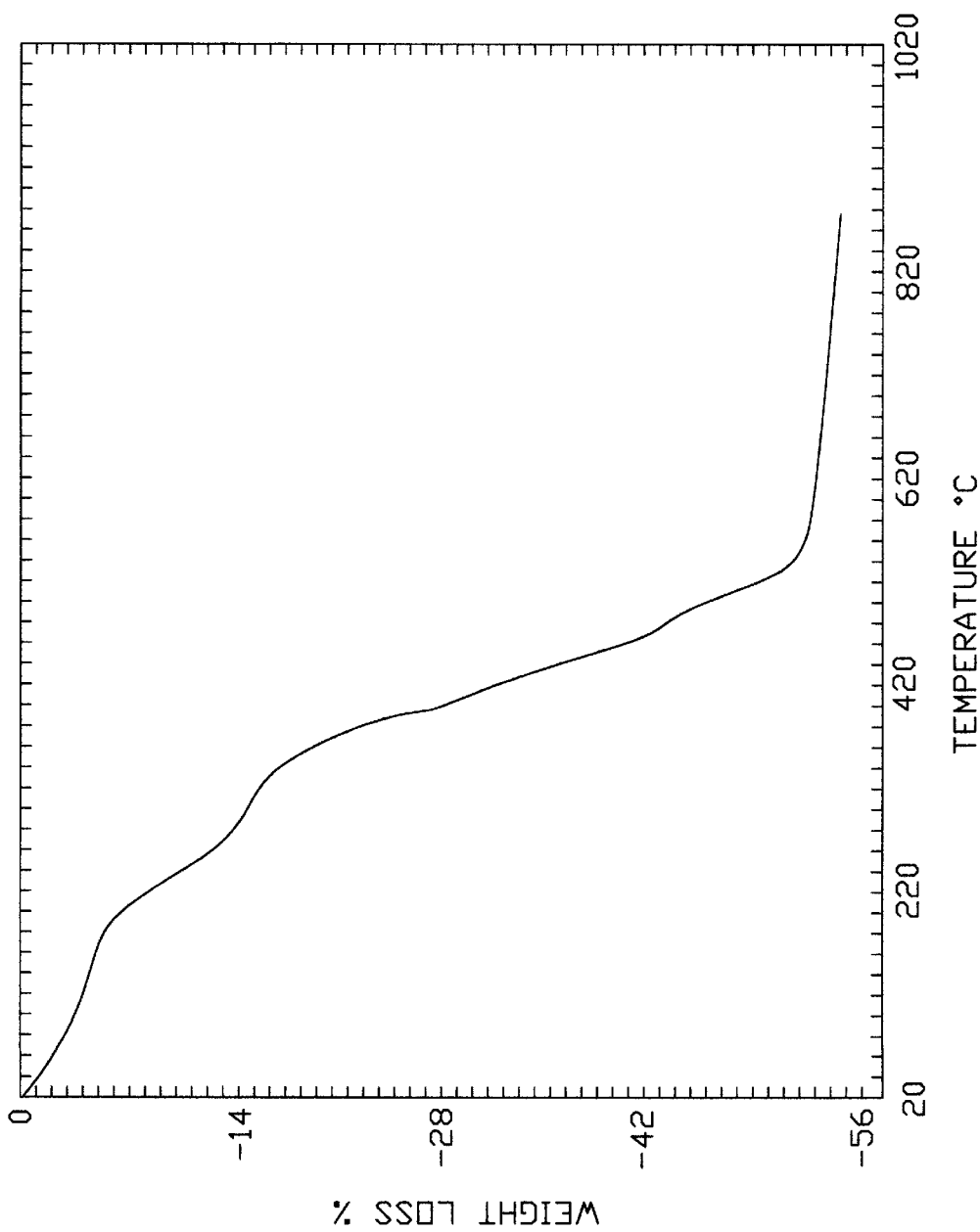

The present invention relates to compositions which may be used as novel fillers for smoking article wrappers for tobacco and tobacco-containing products. As used herein the term tobacco includes not only cut tobacco leaf filler usually found in cigarettes, but also includes expanded tobacco, extruded tobacco, reconstituted tobacco, tobacco stems, tobacco substitutes, and synthetic tobacco, and blends thereof. A tobacco rod includes any substantially cylindrical, tobacco containing smoking article, e.g., a cigarette.

There are no generally accepted and established theories on the specific mechanisms involved in the control of sidestream smoke by components of the paper wrappers. Nevertheless, the physical and chemical properties of the particles used as filler in the paper play an important, if undefined, role in the kinetics of the processes taking place. Thus, discovering unique compositional and morphological features of the filler phases by discovery of reaction conditions involved in their preparation can be of paramount importance.

The present invention has involved studies to develop suitable filler materials for low sidestream papers. Outstanding among these are intimate and inseparable compositions of hydromagnesite with variable quantities of magnesium hydroxide.

For a discussion of the different forms of magnesium carbonates, reference should be made to commonly-owned U.S. Pat. No. 5,228,463, issued Jul. 20, 1993, which is incorporated herein by reference.

The compositions of the present invention are intimate compositions of hydromagnesite ($Mg_5(CO_3)_4(OH)2.4H_2O$) with magnesium hydroxide ($Mg(OH)_2$).

In particular, the compositions are rosette in morphology, having aggregate sizes in the 5–20 $\mu$m range.

The compositions are formed by first preparing a solution, which may be clear to slightly cloudy, of magnesium bicarbonate, in any of a number of ways. For example, an aqueous suspension of hydromagnesite and/or magnesium hydroxide and/or magnesium oxide was treated with gaseous carbon dioxide. Alternatively, an appropriately selected carbonate of magnesium was reacted in water with carbon dioxide gas, or a magnesium salt, e.g., magnesium chloride, was treated with a water-soluble carbonate, e.g., potassium bicarbonate. To increase the throughput of magnesium and to control the relative proportions of the hydromagnesite and magnesium hydroxide in the final composition, a water-soluble magnesium source such as magnesium acetate was added during the preparation of the magnesium bicarbonate, for ease, preferably before the addition of the carbon dioxide. The magnesium bicarbonate solution was then treated with a strong base, preferably potassium hydroxide, which led to the precipitation of the product. It is important that the precipitation occur at or above 50° C. In the cases where the magnesium bicarbonate solution was made from starting materials without the presence of hydromagnesite, the post-base treated slurry was preferably heated to about 90° C. after the base addition, and maintained at 90° C. for at least about one hour.

Without this heating step, nesquehonite ($MgCO_3.3H_2O$) can form as a major product. If hydromagnesite or a combination of hydromagnesite and other magnesium compounds are used in the formation of magnesium bicarbonate suspension, then the incomplete transformation of hydromagnesite to magnesium carbonate will leave sufficient hydromagnesite nuclei to avoid the dominance of nesquehonite in the final product composition. If the temperature is greater than 50° C. during the precipitation reaction, a thermal precipitation reaction can result. After the precipitation reaction is completed, the reaction product can be heated to 90° C. to eliminate all nesquehonite. This heating causes only the slightest change, if any, in the product morphology.

An important physical property of these compositions is their filterability, for this property is related to the ease in which the compositions can be used to make paper. Varying the concentration of the magnesium ion source, e.g., the magnesium acetate, and varying the pH of the reaction medium, the intensity and nature of the agitation of the reaction medium, the temperature profile of the reaction, and other conditions allows one to affect the product composition, the filterability, the morphology and particle size of the product. Table I highlights the impact that synthesis conditions have on the properties of the product composition.

Compositions prepared without magnesium acetate fortification, as shown in Table I, Samples "A", were limited in throughput by the lower initial magnesium concentration. At pH levels above 10.04, magnesium hydroxide was observed by DSC and TGA in the product. The filterability was good, the morphology spherical, and the particle size ranged from ca. 8–25 $\mu$m.

Compositions prepared with magnesium acetate fortification, as shown in Table I, Samples "B", allowed the formation of magnesium hydroxide in the product even when the pH was as low as 9.2. Slurries with product from reactions run at pH levels above 10.1 have very poor filtration properties, i.e., they form gels.

When the pH was maintained at 9.6, the particle size was as small as 4–5 $\mu$m, and when the stirring was low to moderate in intensity, spherical morphology was obtained as shown in Table I, Samples "C". Rapid KOH addition was required, and the magnesium hydroxide percentage was limited to about 15% of the final composition.

When higher concentrations of magnesium acetate were used as shown in Table I, Samples "D", and the pH was kept constant at 9.6, samples with a higher magnesium hydroxide percentage, up to about 50%, were achieved. The morphology and size of the product was affected such that chunks were obtained instead of discrete spheres.

Some general conclusions are as follows, although applicants offer these by way of explanation only and do not wish to be bound by any particular theory. To obtain a magnesium hydroxide-hydromagnesite composition, either a high pH and/or high concentration of a magnesium ion source, e.g., magnesium acetate, is used. An upper limit of about 15% magnesium hydroxide is obtainable using pH alone, without magnesium acetate. Levels of pH that are too high may result in compositions which do not filter well.

Magnesium acetate addition increases the possible throughput (i.e. product yield per unit volume of reaction mixture) and allows higher magnesium hydroxide percentages in the final compositions. At higher acetate concentrations, the morphology is substantially modified in that discrete particles are not formed but chunks or agglomerates are formed. Spherical products give the best filterability. The magnesium hydroxide in the product composition does not crystallize as an X-ray observable (as brucite) until relatively high concentrations are present, i.e., 50%. Thus, the magnesium hydroxide formed is of very small crystallite size and/or is amorphous.

Of some importance is that the hydromagnesite/magnesium hydroxide compositions are stable at room temperature over extended times. If hydromagnesite is used in the magnesium bicarbonate formation step, undissolved residual hydromagnesite typically remains; these will serve as nuclei which force the reaction to form a hydromagnesite-magnesium hydroxide composition. Without hydromagnesite nuclei, nesquehonite is formed at 50° C. Alternatively, if hydromagnesite is not present but the slurry is heated to 90° C. after the base is added, spherical shape compositions of hydromagnesite-magnesium hydroxide are formed. This is because the stability field of these magnesium compounds is such that nesquehonite is not stable at the higher temperatures.

Alternatively, the magnesium bicarbonate solution employed above may be prepared by treating with carbon dioxide aqueous mixtures of a number of the various other magnesium carbonates such as nesquehonite, lansfordite, dypingite, and/or georgiosite, either alone or in combinations with each other and/or in combination with any of the set of magnesium hydroxide, magnesium oxide, or hydromagnesite. Alternatively, the above solution can be prepared by treating a water-soluble magnesium salt, e.g., magnesium chloride, with an alkali metal carbonate or bicarbonate, e.g., potassium carbonate or potassium bicarbonate, in aqueous medium.

The materials of the present invention are produced by adaptations of sol-gel techniques. For descriptions of various sol-gel techniques, see R. Roy, "Ceramics by the Solution Sol-Gel Route," *Science* 238, pp. 1664–69 (1987); H. Schmidt, "Chemistry of Material Preparation by the Sol-Gel Process," I *Non-Crystalline Solids,* 100, pp. 51–64 (1988), and *Gmelins Handbuch Der Anorganischen Chemie Magnesium, Teil B*2, p. 303, Verlag Chemie, GmbH., Berlin (1938); see also U.S. Pat. No. 4,998,542; each of the foregoing is incorporated herein by reference.

Through the use of the methods of this invention, various sol-gel techniques may be modified for the preparation of particles. The modifications of technique allow the reaction mixture to produce products that are ultimately extensively crystallized. The particles produced by these unique processes are incorporated as the sole filler in the fabrication of cigarette paper or admixed with other metal oxides or carbonates, such as magnesite or calcium carbonate, to provide a very effective means of reducing sidestream smoke in cigarettes prepared therefrom, with no adverse effect on the taste subjective or ash appearance of the cigarettes.

As discussed above and shown below, the reaction conditions used in the preparation of the invention materials are novel and produce unique homogeneous aggregates. Under suitable conditions the aggregates can consist of spherical particles composed of intimately intergrown and inseparable mixtures of hydromagnesite and magnesium hydroxide in micron particle sizes. Under scanning electron microscopic (SEM) examination, the particles appear as spherical rosettes, characteristic of hydromagnesite. Electron diffraction has revealed that the magnesium hydroxide is contained within and at the outer edges of the rosette folds. The materials of this invention can be produced as intimate compositions.

Useful materials have a range of surface areas, from very low to very high, a range of particle sizes (mostly in the micron range), possess appropriate opacity, have low water solubility (required for papermaking), and possess other properties that are considered desirable in fillers for cigarette papers. All of these properties are not found in commercially available hydromagnesite or magnesium hydroxide nor can they be reproduced by physical mixtures of commercial hydromagnesite and magnesium hydroxide.

When used as filler in the fabrication of wrappers for smoking articles, an amount equal to 5 to 45% of the final wrapper weight should be used, preferably about 10 to 35% by weight. This percentage is referred to as the filler loading. A portion, e.g., up to 60% by weight, of the filler loading can comprise one or more inorganic oxides, inorganic hydroxides or inorganic carbonates in order to blend with the filler produced according to the present invention without compromising sidestream smoke reduction or subjective taste acceptability. Examples of such fillers include, e.g., magnesium oxide, magnesium hydroxide, magnesite, calcium carbonate, titanium dioxide and hydromagnesite, or other fillers known in the art. Alternatively, no additional filler may be employed.

Sizing agents such as alkali metal salts should be added to the wrapper to adjust or control the burn rate of the resulting smoking article at an amount equal to between about 2 to about 15% by weight of the wrapper and preferably 3 to 10%. Preferred sizing agents include alkali metal salts of carboxylic acids or phosphoric acid such as, for example, sodium and potassium salts, and specifically one or more of the following: sodium fumarate, sodium citrate, potassium dihydrogen phosphate, and, preferably, potassium citrate and potassium succinate.

The wrappers containing the fillers of the invention have a basis weight of between 25 to about 70 grams per square meter and have a porosity of between 2 to about 15 cubic centimeters per minute per square centimeter as measured by the CORESTA method ("CORESTA units"). The most preferred basis weight is between 35 to 65 grams per square meter and the most preferred porosity is between about 4 to about 8 CORESTA units.

In the examples which follow, an aqueous suspension of hydromagnesite is solubilized by bubbling in carbon dioxide gas. This solution is then either treated with a base, such as potassium hydroxide, sodium hydroxide, or ammonium hydroxide, or is mixed with an aqueous solution of magnesium acetate followed by treatment with the base. Addition of the base causes the solution to thicken to a transient, translucent gel-like consistency, which upon continued stirring forms a white precipitate. The resultant precipitates are recovered by centrifugation and the solids repeatedly washed with water and centrifuged to remove excess alkali. Solids in fully compacted wet paste produced by centrifugation at 2500 rpm for 10 minutes constitute about 6 to 10% of the total weight. Careful control of the pH during precipitation yields particles that settle and filter easily, which can be recovered by filtration rather than centrifugation. Samples of washed solids are then dried and submitted for characterization.

Characterization of the products revealed that by varying the reaction conditions and the amount of base used in the precipitation step, magnesium carbonate hydroxides can be produced which consist of a single morphology (homogeneous), as examined by scanning electron microscopy (SEM). Thermogravimetric analysis (TGA) shows the products to be compositions of either hydromagnesite or hydromagnesite and magnesium hydroxide. The ratio of the compositions increasingly favors magnesium hydroxide as the amount of base used in the precipitation step is increased for a given concentration of magnesium acetate in the reaction solution.

The use of these magnesium carbonate hydroxide compounds as fillers in cigarette papers results in the reduction of sidestream smoke while maintaining subjective acceptability. Of the compounds produced, the materials analyzing as compositions of hydromagnesite and magnesium hydroxide were found to be the most preferred sidestream reducing fillers. Papers made from these materials admixed with various amounts of calcium carbonate produced cigarettes which exhibited as much as 78% reduction in sidestream smoke when compared to the standard cigarette, but were otherwise similar to the standard cigarette in ash appearance and smoke taste qualities.

To prepare wrappers containing the fillers of the invention, conventional cigarette papermaking procedures are used with the substitution of a mixture of the magnesium carbonate hydroxide compositions and calcium carbonate for the conventional calcium carbonate filler. The paper wrappers may be made from flax, wood pulp, or other plant fibers. In addition, the paper wrappers may be a conventional one wrapper construction, a multiwrapped construction or a multilayer single wrap construction.

In the practice of this invention for the purpose of sidestream smoke reduction, the synthetic inorganic magnesium compositions may be used alone or preferably may be blended with other fillers as discussed previously.

The following examples demonstrate the practice and beneficial results of this invention and should be read as illustrations of, rather than limitations on, the present invention.

EXAMPLES

Thermal decomposition analyses were conducted by placing about 5 mg of the dried sample in a Seiko Instruments Inc. thermal analysis instrument (TG/DTA 300). The weight of the sample was determined and recorded every half second as the sample was being heated to approximately 950° C. at a rate of about 20° C. per minute. The data generated were plotted as shown in the FIGS. 1–3 described herein.

Figure 1B:
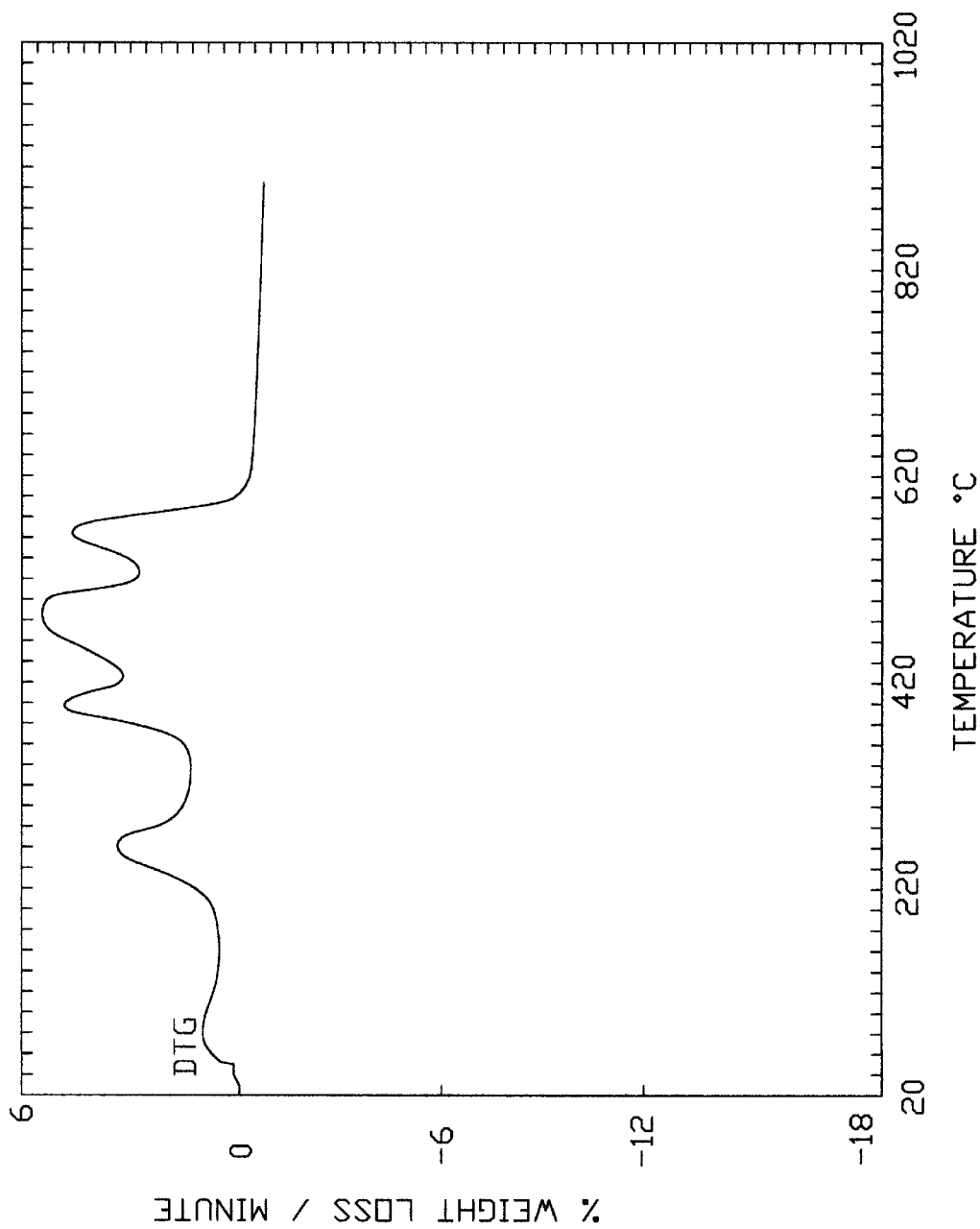
Figure 1C:
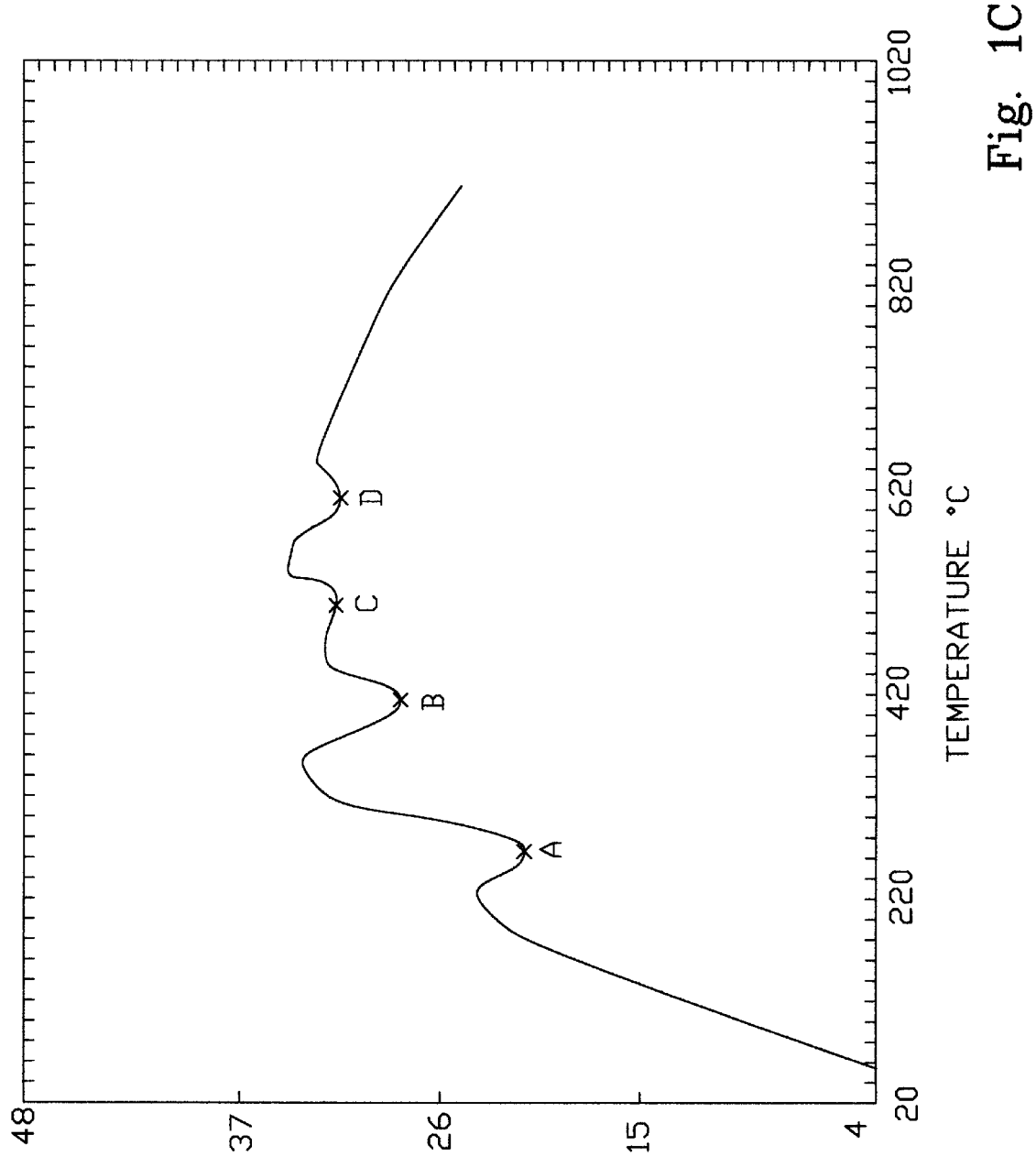

For FIGS. 1a, 1b, and 1c it should be noted that the sample was 4.148 mg, while the reference was 145 mg platinum, sampling occurred every 0.5 seconds, and the gas used was air at 100 ml/min. FIG. 1C includes data points A, B, C, and D. Data point A occurred at 253° C., 19.47 minutes into the heating profile, at 22.96 microvolts on the thermocouple to the reference. Data point B occurred at 374° C., 18.82 minutes into the heating profile, at 29.01 microvolts on the thermocouple to the reference. Data point C occurred at 436° C., 21.57 minutes into the heating profile, at 31.68 microvolts on the thermocouple to the reference. Data point D occurred at 510° C., 24.88 minutes into the heating profile, at 31.99 microvolts on the thermocouple to the reference. Total weight loss was 53.91%

Figure 2A:
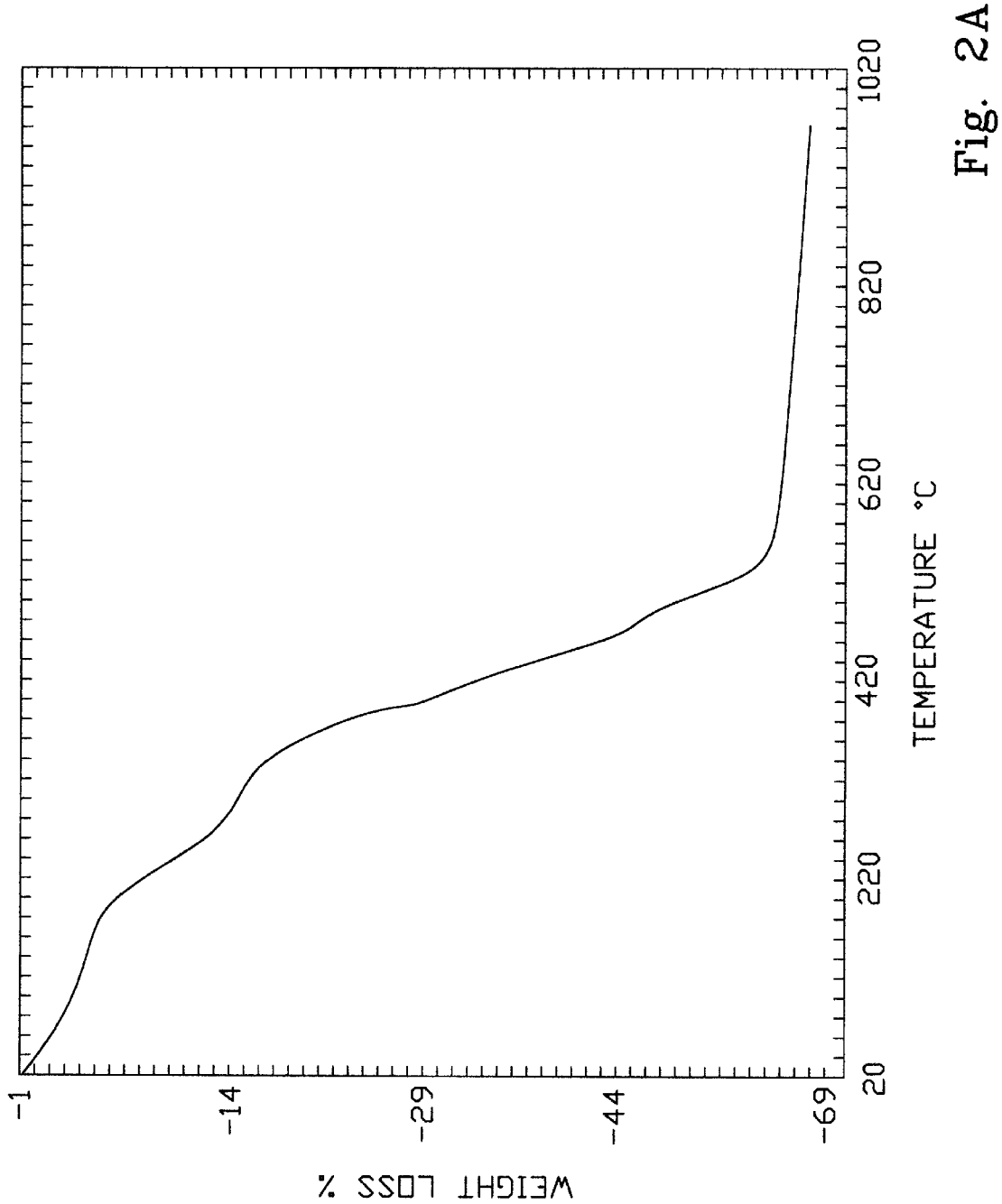
Figure 2B:
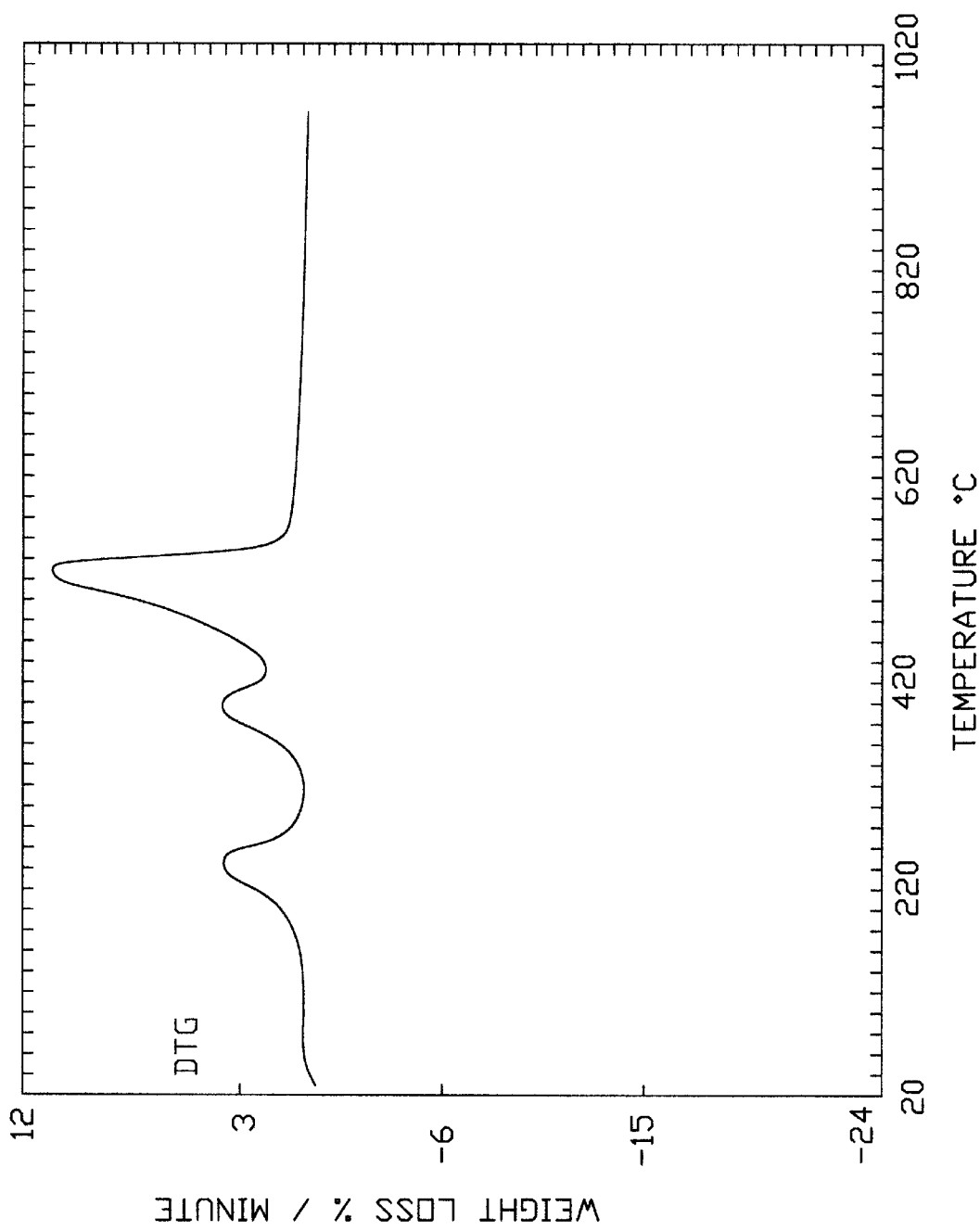

For FIGS. 2a, 2b, and 2c it should be noted that the sample size was 6.2 mg, while the reference was 145 mg platinum, and the gas used was helium at 50 ml/min. FIG.

2C includes data points E, F, and G. Data point E occurred at 246° C., 10.26 min into the heating profile, at 1.25 microvolts on the thermocouple to the reference. Data point F occurred at 358° C., 15.29 minutes into the heating profile, at 3.21 microvolts on the thermocouple to the reference. Data point G occurred at 456° C., 19.83 minutes into the heating profile, at 1.58 microvolts on the thermocouple to the reference. Total Weight loss was 53.44%.

Figure 3:
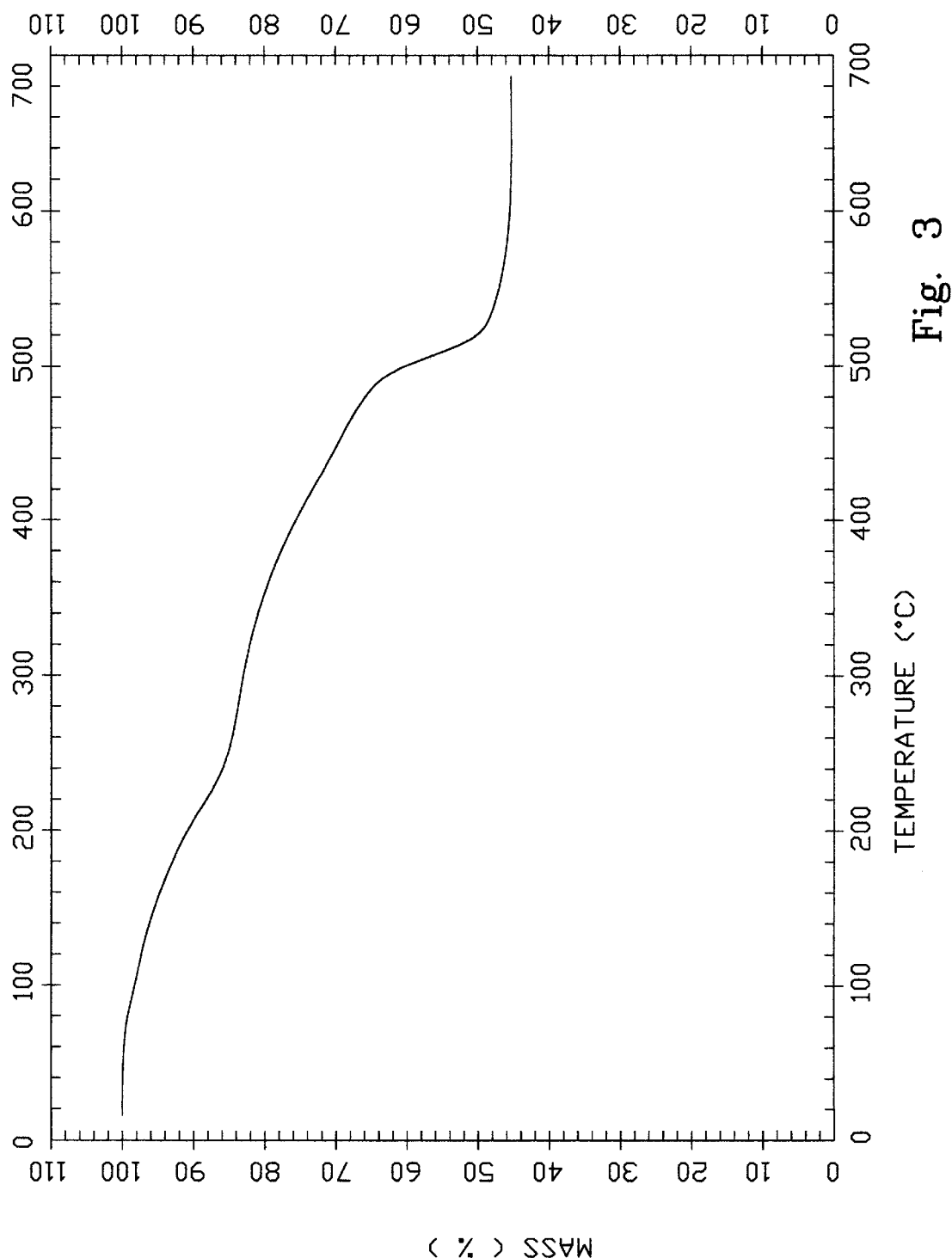
FIGS. 3 is a TG thermal decomposition plots for the material produced in Example IX.

For FIG. 3, the initial weight of the sample was 4.315 mg, the final weight was 1.956 (45%), and the gas flow rate was 40 cc/min.

Figure 4A:
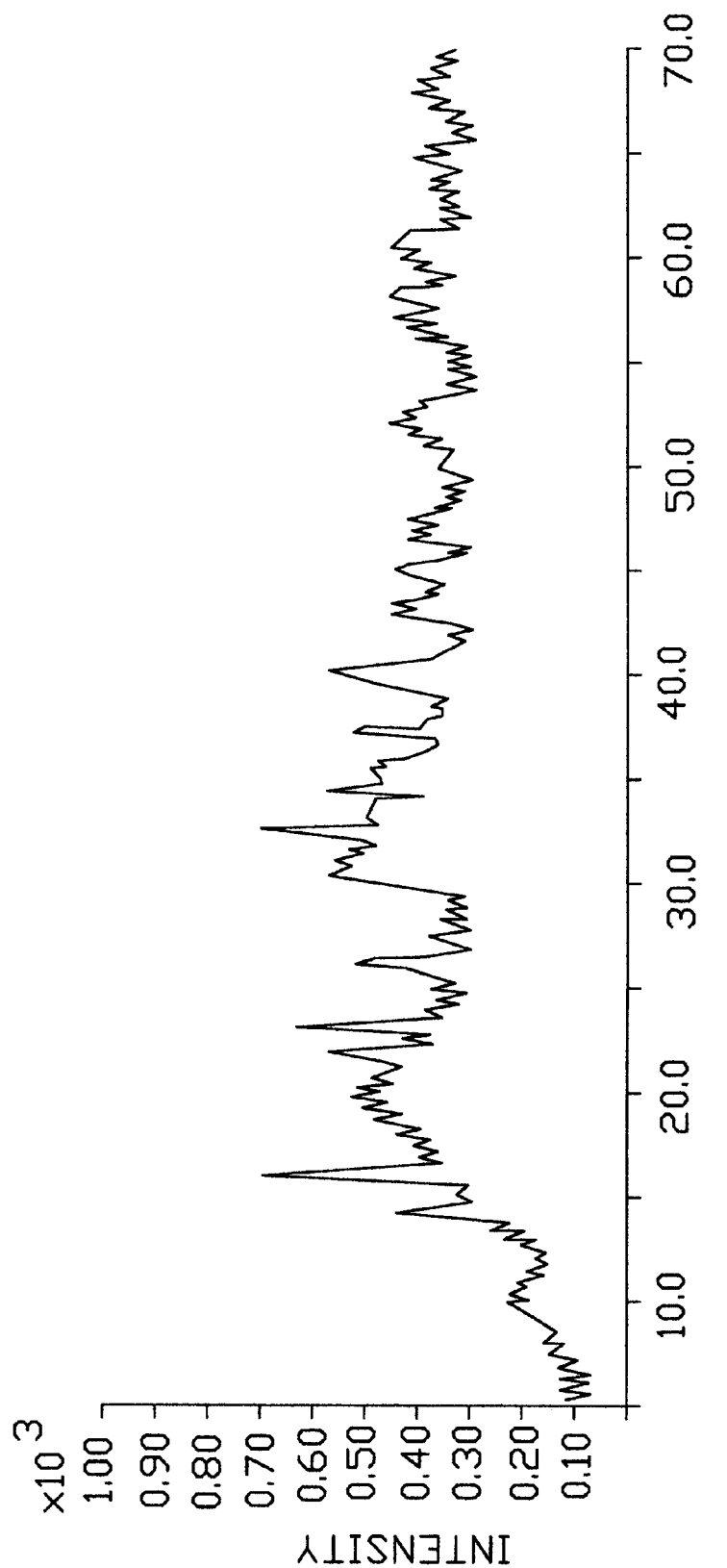
FIG. 4a is an X-ray diffraction pattern for the material produced in Example IX.
Figure 4B:
FIG. 4b is a hydromagnesite standard.
Figure 4C:
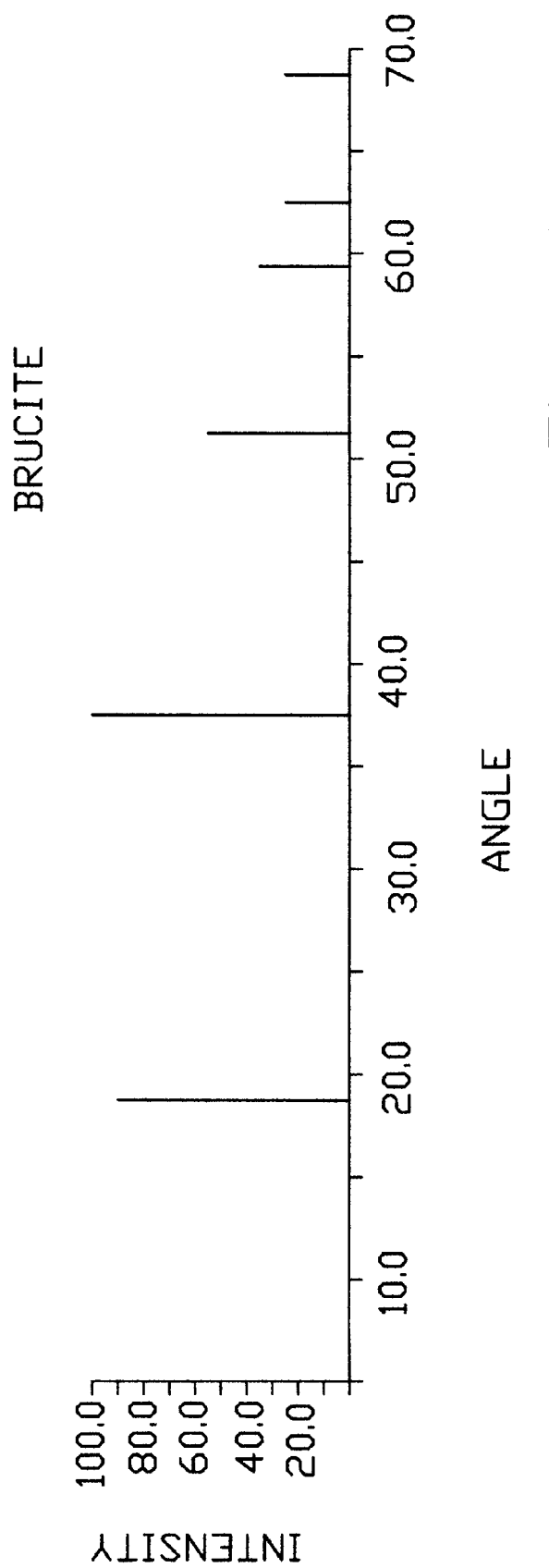
FIG. 4c is a brucite standard.

X-ray diffraction patterns were obtained using a Siemens D500 Automated Powder Diffractometer with a graphite monochromator. The instrument was set up with a Cu radiation ($\lambda$=1.54 Å) x-ray source operating at 50 kV and 40 mA. The two-theta scan range was set from about 5° to about 80° using a step scan window of 0.05°/1.0 second step. Beam slits were set at 1°, 1°, 1°, 0.15°, and 0.15° widths. Two-theta calibration was performed using an NBS mica standard (SRM 675). Data were collected and reduced with the use of a Micro VAX II computer. The data generated were plotted as shown in FIG. 4 described herein.

Please note that the estimated hydromagnesite-magnesium hydroxide compositions cited herein are calculated from the observed weight loss to ~800(C under TGA conditions: % Hydromagnesite=(% Weight Loss–30.9) / 0.26. This formula is correct, assuming that only hydromagnesite and magnesium hydroxide are present in the composition.

Example I

To a 2-Liter beaker fitted with a magnetic stirrer there were added 15.0 g of hydromagnesite (Aldrich) in 1800 mL of deionized water. A stream of $CO_2$ gas was bubbled through the suspension for approximately 16 hours, while the mixture was stirred. At the end of that period of time, stirring was stopped and the slightly cloudy solution was filtered to remove traces of undissolved residue. The clear solution, stirred vigorously, was then treated with approximately 50 mL of 50% potassium hydroxide solution to a final pH of 10.7. Addition of the potassium hydroxide produced a voluminous quantity of a gelatinous precipitate, which changed rapidly into a white flocculent precipitate. After the stirring was stopped, the flocculent particles settled very slowly. The precipitate was then recovered by centrifugation at 2500 rpm for 10 minutes. The supernatant was removed by decanting and the precipitate was washed by centrifugation five times with 5 volumes of water each time, to remove excess alkali. An aliquot of the resulting slurry was evaporated to dryness at about 105° C. for analytical characterization of the precipitate. The dried precipitate was a fluffy white powder. FT-IR showed the powder to be of a composition of hydromagnesite and magnesium hydroxide. TGA indicated the composition to consist of 84% hydromagnesite and 16% magnesium hydroxide.

Example II

A suspension of 15.0 g of hydromagnesite (Aldrich) in 1600 mL of distilled water was magnetically stirred in a 2-Liter beaker while being treated with an excess of gaseous $CO_2$ over a period of 12 hours to effect solubilization of the hydromagnesite. The resulting solution, containing a small amount of refractive material, was filtered to give a clear, colorless solution. This solution was then heated to 30° C. and further treated with gaseous carbon dioxide for one hour, while maintaining the temperature at 30° C.

The heated solution was then treated with 94 mL of 6N potassium hydroxide solution with continued stirring (to a final pH of 10.57). The resulting suspension was stirred for three minutes followed by standing at room temperature overnight to allow settling of the precipitate. The clear supernatant was decanted and the residual suspension concentrated by centrifugation. The recovered precipitate was washed with water followed by centrifugation several times until the pH dropped below 10.0. An aliquot of the resultant wet cake was dried at about 105° C. for analytical characterization of the precipitate.

FT-IR showed the material to be a composition of hydromagnesite and magnesium hydroxide. TGA indicated the solids to consist of 49% hydromagnesite and 51% magnesium hydroxide.

Example III

The procedure described in Example II was repeated in its entirety, with the exception that in this case the heated solution was treated with 87.5 mL of 6N KOH solution to bring the pH of the reaction mixture to 10.28. The precipitate was recovered and washed as described in the aforementioned example. A dried sample of this material was shown by TGA to consist of 91% hydromagnesite and 9% magnesium hydroxide.

Example IV

A suspension of 15.0 g of hydromagnesite (Aldrich) in 1600 mL of distilled water in a 2-Liter beaker was magnetically stirred and treated with an excess of gaseous $CO_2$ over a period of 16 hours to effect solubilization of the hydromagnesite. The resulting solution, containing a small amount of refractive material, was filtered to give a clear, colorless solution. To this were added 160 mL of an aqueous solution containing 17.1 g of magnesium acetate tetrahydrate. This solution was heated to 30° C. and further treated with gaseous $CO_2$ for one hour, while maintaining the temperature at 30° C. The heated solution was treated with 108.5 mL of 6N potassium hydroxide solution with continued stirring to adjust the pH to 10.6. The resulting suspension was stirred for three minutes, followed by standing at room temperature overnight to allow settling of the precipitate. The clear supernatant was decanted and the residual suspension concentrated by centrifugation.

The recovered precipitate was washed with water followed by centrifugation several times until the pH dropped to below 10.0. An aliquot of the resultant wet cake was dried at about 105° C. for analytical characterization of the precipitate.

FT-IR showed the dried material to be a composition of hydromagnesite and magnesium hydroxide. TGA indicated the composition to consist of 59% hydromagnesite and 41% magnesium hydroxide.

Example V

The synthetic procedure described in Example IV was repeated in its entirety, with the exception that in this case the heated solution mixture was treated with 98.2 mL of 6N potassium hydroxide solution to bring the pH of the reaction mixture to 10.32. The precipitate was recovered and washed as described in Example IV. A dried sample of this material was shown by TGA to consist of 72% hydromagnesite and 28% magnesium hydroxide.

Example VI

The synthetic procedure described in Example IV was repeated in its entirety, with the exception that in this case the heated solution mixture was treated with 2.0 g of urea, followed by 98.2 mL of 6N potassium hydroxide solution to bring the pH of the reaction mixture to 10.39. The precipitate was recovered and washed as described in Example IV. A dried sample of this material was shown by FT-IR to be a composition of hydromagnesite and magnesium hydroxide. TGA indicated the material to consist of 88% hydromagnesite and 12% magnesium hydroxide (FIGS. 1a,1b, and 1c).

Example VII

The synthetic procedure described in Example VI was repeated in its entirety, with the exception that in this case the heated solution mixture was treated with 94.0 mL of 6N potassium hydroxide solution to bring the pH of the reaction mixture to 10.18. The precipitate was recovered and washed as described in Example IV. A dried sample of this material was shown by FT-IR to be a composition of hydromagnesite and magnesium hydroxide. TGA indicated the material to consist of 87% hydromagnesite and 13% magnesium hydroxide (FIGS. 2a, 2b, and 2c).

Example VIII

A suspension of 15.0 g of hydromagnesite (Aldrich) in 1600 mL of distilled water was magnetically stirred, in a 2-Liter round-bottom flask, while being treated with an excess of gaseous $CO_2$ over a period of 16 hours to effect solubilization of the hydromagnesite. The resulting solution, containing a small amount of refractive material, was filtered to give a clear, colorless solution. To this were added 160 mL of an aqueous solution containing 17.1 g of magnesium acetate tetrahydrate. This solution was heated to 30° C. and further treated with gaseous $CO_2$ for one hour, while maintaining the temperature at 30° C. Addition of carbon dioxide was stopped and the temperature of the reaction solution was raised to 55° C. The reaction solution, held at 55° C., was then purged with a stream of nitrogen gas until the appearance of a slight cloudiness. The heated solution was treated with 84.0 mL of 6N potassium hydroxide solution with continued stirring to adjust the pH to 10.56.

The resulting suspension was stirred for three minutes, followed by standing at room temperature overnight to allow settling of the precipitate. The clear supernatant was decanted and the residual suspension further concentrated by centrifugation. The recovered precipitate was washed with water followed by centrifugation several times until the pH was 9.9. An aliquot of the wet cake was dried at about 105° C. for analytical characterization of the precipitate.

FT-IR showed the dried material to be a composition of hydromagnesite and magnesium hydroxide. TGA indicated the composition to consist of 87% hydromagnesite and 13% magnesium hydroxide.

The remaining wet cake was dispersed in one liter of distilled water with gentle stirring and the suspension brought to a boil and kept at that temperature for 6 hours. The suspension was allowed to settle and the clear supernatant was decanted to leave a thick slurry.

Example IX

A suspension of 10.0 g of hydromagnesite (Aldrich) in 1000 mL of distilled water was magnetically stirred, in a 2-Liter beaker, while being treated with an excess of gaseous $CO_2$ over a period of 16 hours to produce a slightly cloudy solution. To the cloudy solution were added 17.0 g of magnesium acetate tetrahydrate with stirring to dissolve the acetate salt. The resultant solution was heated to 50° C. and treated with gaseous $CO_2$ for one hour, while maintaining the temperature of 50° C. To the heated solution were added 48.0 mL of 5N potassium hydroxide solution with gentle hand stirring to bring the pH to 9.6. The resulting suspension was filtered using a filtering cloth and the white precipitate was washed with several volumes of water to remove soluble byproducts. A sample of the wet cake was dried at about 105° C. for analytical characterization of the material.

Based on FT-IR, the dried material appeared to be a composition of hydromagnesite and magnesium hydroxide. TGA indicated the composition to consist of 91% hydromagnesite and 9% magnesium hydroxide (FIG. 3). SEM indicated only a single phase possessing the morphology characteristic of hydromagnesite. The X-ray powder diffraction pattern (FIG. 4) showed prominently the presence of hydromagnesite without indication of brucite (crystalline magnesium hydroxide). It is thought that because the magnesium hydroxide particles are small, probably less than 100 Å, they are not seen by typical X-ray analysis.

Example X

The synthetic procedure described in Example IX was repeated in its entirety, with the exception that in this case 28.4 g of magnesium acetate tetrahydrate were added and that the heated solution mixture was treated with 81.2 mL of 5N potassium hydroxide solution to bring the pH of the reaction mixture to 9.8. The product slurry was allowed to stand overnight and the precipitate was recovered and washed as described in Example IX. A dried sample of this material was shown by TGA to consist of 70% hydromagnesite and 30% magnesium hydroxide.

Example XI

The synthetic procedure described in Example IX was repeated in its entirety, with the exception that in this case 45.3 g of magnesium acetate tetrahydrate were added and that the heated solution mixture was treated with 112 mL of 5N potassium hydroxide solution to bring the pH of the reaction mixture to 9.8. The precipitate was recovered and washed as described in Example IX. A dried sample of this material was shown by TGA to consist of 61% hydromagnesite and 39% magnesium hydroxide. X-ray powder diffraction also showed the presence of both hydromagnesite and magnesium hydroxide (brucite).

Example XII

A suspension of 16.2 g of magnesium hydroxide paste (Reheis, approximately 30% solids) in 1000 mL of distilled water was magnetically stirred in a 2-Liter beaker while being treated with an excess of gaseous $CO_2$ over a period of 2 hours to produce a clear solution. To this solution were added 11.3 g of magnesium acetate tetrahydrate with stirring to dissolve the acetate salt. The resultant solution was heated to 50° C. and treated with gaseous $CO_2$ for one hour, while maintaining the temperature at 50° C. To approximately half of this heated solution (i.e., about 500 mL), in a 1-Liter beaker, were added 24.8 mL of 5N potassium hydroxide solution with gentle hand stirring to bring the pH to 10.13.

The resulting suspension was heated to 90° C. where it was held for one hour without agitation. The reaction mixture was cooled, filtered, and the resulting white precipitate washed with several volumes of water to remove soluble byproducts. X-ray powder diffraction indicated the presence of both hydromagnesite and magnesium hydroxide.

Example XIII

A magnesium bicarbonate solution was prepared from hydromagnesite (15.0 g) and magnesium acetate (17.0 g) in water (circa 1000 mL) by bubbling carbon dioxide through the aqueous suspension overnight. [Minor residual undissolved solids derived from the hydromagnesite used were not removed by filtration.] The resulting solution was heated to 50° C. with magnetic stirring and aqueous KOH was added while continuing the magnetic stirring. Five different experiments were run, and in each case, the amount of KOH was varied and the final pH was measured and is shown in Table II. The precipitate was filtered and dried in an oven at about 110° C., resulting in a solid material which was examined by TGA to determine the hydromagnesite/magnesium hydroxide ratio, and by SEM to determine the morphology and size of product. The materials were also evaluated for their ease in filtration. These results are summarized in Table II. The X-ray powder pattern of brucite was not observed in the X-ray powder patterns (XRD) of the samples with pH<10.6, indicating that the magnesium hydroxide has a very small crystalline size, i.e., <50 Å. The XRD of the sample at pH=10.61 showed broad brucite peaks. SEM analysis of these samples showed neither spheres nor rosettes, due to the agitation during the base addition.

Example XIV

The procedure of Example XIII was followed with the two exceptions that the magnesium bicarbonate suspension was filtered prior to the addition of base and agitation was achieved using a glass rod instead of magnetic stirring. When the resultant material was heated to only 50° C., only nesquehonite was obtained at pH 10.1. However, when the resultant material was heated to 90° C., spherical compositions of hydromagnesite-magnesium hydroxide were obtained.

Example XV

The procedure of Example XIII was followed with the following exceptions: 18.0 g of Reheis paste magnesium hydroxide was used instead of hydromagnesite at a starting material, along with 11.3 g of magnesium acetate in 1 L of deionized water. A clear solution was obtained after bubbling carbon dioxide through the mixture for two hours. 5N KOH was added at 50° C. until a pH of 10.1 was obtained. The slurry was then immediately heated to 90° C. and allowed to stay at that temperature for one hour. The resultant precipitate consisted of spherical particles of hydromagnesite.

In Examples XVI–XVIII, the hydromagnesite employed was a Reagent Grade of "Magnesium Carbonate Basic", Catalog #M1025, of Spectrum Chemical Mfg. Corp., 1442 S. San Pedro Street, Gardena, Calif. 90248. This commercially available hydromagnesite was totally soluble in carbonic acid and therefore left no visible insoluble residue.

Example XVI

Hydromagnesite (100.0 g, 1.07 g-atoms Mg) was weighed into a 12 L kettle. Water (10 L) was added, and the mixture stirred as carbon dioxide was sparged in all day (6 hours). The still opalescent solution was allowed to stand, stoppered, under an atmosphere of carbon dioxide, overnight. The next morning, the solution was clear. Magnesium acetate tetrahydrate (284.4 g, 1.33 g-atom Mg) was added; water (50 mL) was used to rinse it in. The solution was stirred, with resumed sparging of carbon dioxide, as the solution was heated to 51.5° C. over a period of four hours.

A solution of potassium hydroxide pellets, 150.2 g, 87.2% assay, and 110.9 g, 87.4% assay, 4.10 moles total, in water, 690 mL, was added to the stirred solution of magnesium salts at 50° C. over 1 minute; water (50 mL) was used to rinse it in. The temperature rose to 52° C. in consequence of adding the KOH solution while it was still hot from being freshly prepared. External heating was continued with stirring; the temperature reached 95.5° C. after 3.25 hours. It was kept above 88° C., with stirring, for an hour, then let cool overnight.

The mixture was allowed to stand overnight, and by next morning had cooled to 32° C. The slurry was filtered under suction. The filtrates were examined by freshly calibrated pH meter, and had a pH of 10.90. The resulting filtercake was washed thoroughly with water. Yield 546.1 g. Of the resulting paste, 19.26 g was dried at room temperature. Solid residue: 8.15 g, for a solids content of 42.3%.

A sample thus dried in air was examined by TG/DTA, and showed a weight loss of 57.4%. This indicates essentially pure hydromagnesite.

Example XVII

Hydromagnesite (100.1 g, 1.07 g-atoms Mg) was weighed into a 12 L kettle. Water (10 L) was added, and carbon dioxide was sparged in for a total of about 13 hours, over two days. The still opalescent solution was then allowed to stand, stoppered under an atmosphere of carbon dioxide, overnight. The next morning, the solution was clear. Magnesium acetate tetrahydrate (170.1 g, 0.79 g-atom Mg) was added, with water (50 mL) for rinsing. The solution was stirred, with resumed sparging of carbon dioxide, as the solution was heated to 50° C. (over 1 hour).

A solution of potassium hydroxide pellets (227.5 g, 87.4% assay, 3.54 moles) in water (600 mL) was added to the stirred solution of magnesium salts at 50° C. over 1 minute; water (50 mL) was used to rinse it in. The temperature rose to 52° C. in consequence of adding the KOH solution while it was still hot from being freshly prepared. External heating was discontinued; stirring was maintained for 2 hours.

The mixture was allowed to stand overnight, and by next morning had cooled to 31° C. The slurry was filtered under suction. The filtrates were examined by freshly calibrated pH meter, and had a pH of 10.93. The resulting filtercake was washed thoroughly with water (7 L), using two 18.5 cm diameter Buchner funnels with Whatman #1 filter paper. The two funnels yielded filter-cakes of 568.7 g and 637.5 g, for a combined yield as a wet paste of 1206.2 g. The two filter-cakes may have differed slightly in final moisture content due to difficultly in applying equal treatment to the two samples. A sample (11.11 g) afforded 1.91 g of solids upon drying in an oven at about 105° C. (Solids content= 17.2%) By TGA, some potassium was still present.

A sample (28.08 g) was allowed to dry at room temperature to yield 4.34 g (15.5% solids content). This was for XRD examination, with a view to minimizing artifact formation during heating.

A sample was examined by TGA, and showed a weight loss of 55.0%. This computes as 93% hydromagnesite, ignoring the potassium content.

Example XVIII

Hydromagnesite (100.0 g, 1.07 g-atoms Mg) was weighed into a 12 L kettle. Water (10 L) was added, and the mixture stirred as carbon dioxide was sparged in for 7.3 hours. The still opalescent solution was allowed to stand, stoppered, under an atmosphere of carbon dioxide, overnight. The next morning, the solution was clear. Magnesium acetate tetrahydrate (284.3 g, 1.33 g-atom Mg) was added; water (100 mL) was used to rinse it in. The solution was stirred, with resumed sparging of carbon dioxide, as the solution was heated to 51.5° C. over 1.3 hours.

A solution of potassium hydroxide pellets (296.5 g, 87.4% assay, 4.62 moles) in water (780 mL) was added to the stirred solution of magnesium salts at 52° C. over 2 minutes; water (100 mL) was used to rinse it in. The temperature rose to 54.5° C. in consequence of adding the KOH solution while it was still hot from being freshly prepared. External heating was discontinued; stirring was maintained for 5.8 hours. The temperature fell to 39° C.

The mixture was allowed to stand overnight. The slurry was filtered under suction. The filtrates were examined by freshly calibrated pH meter, and had a pH of 10.8. The resulting filtercake was washed thoroughly with water (circa 12 L) for 3 days. Yield was 684.1 g.

A sample (11.8 g) was allowed to dry in an oven at about 105° C.; yield was 3.25 g (27.4% solids content).

A sample was examined by TGA, showing a weight loss of 52.0%. This computes as 81% hydromagnesite and 19% magnesium hydroxide.

Example XIX

Hydromagnesite (100.3 g, 1.07 g-atoms Mg) was weighed into a 12 L kettle. Water (10 L) was added, and the mixture stirred as carbon dioxide was sparged in and allowed to react as described in Example XVIII; magnesium acetate tetrahydrate (284.4 g, 1.33 g-atom Mg) was added; water (100 mL) was used to rinse it in. The solution was stirred, with resumed sparging of carbon dioxide, as the solution was heated to 54° C. (over 3 hours).

A solution of potassium hydroxide pellets (331.9 g, 87.4% assay, 5.17 moles) in water (870 mL) was added to the stirred solution of magnesium salts at 55° C. over 1 minute; water (100 mL) was used to rinse it in. The temperature rose to 58° C. in consequence of adding the KOH solution while it was still hot from being freshly prepared. External heating was discontinued; stirring was maintained for 2.5 hours, during which the temperature fell to 48° C.

The mixture was allowed to stand overnight, and by next morning had cooled to 30° C. The slurry was filtered under suction. The filtrates were examined by freshly calibrated pH meter, and had a pH of 10.8. The resulting filtercake was washed thoroughly with water (circa 12 L) for 3 days. Yield of product was 771.6 g, as a paste.

A 7.32 g sample was allowed to dry at room temperature to yield 1.96 g, for a 26.8% solids content. This sample was for XRD examination, with a view to minimizing artifact formation during heating.

A sample was examined by TGA, and showed a weight loss of 47.5%. This computes as 64% hydromagnesite.

The inorganic magnesium compositions prepared as described in the above examples, were stored as slurries or pastes until used as fillers for cigarette wrappers, which in turn were used to prepare cigarettes. The cigarette wrappers were constructed by combining flax fibers with approximately 30% by weight of the example of filler composition alone, or with various mixtures of the example filler compositions with calcium carbonate in the proportion shown in Table III. In either case, the fiber and filler slurries were then cast to a target basis weight of 45 g/m$^2$. After being dried, the wrappers were treated with a solution of potassium succinate, as a sizing agent, the papers were then used to fabricate cigarettes using a commercial blend of tobaccos.

TABLE I

|  | Series | pH | Magnesium Hydroxide a % | Filterability | Morphology | Size ($\mu$) | Observation |
| --- | --- | --- | --- | --- | --- | --- | --- |
| Without Magnesium Acetate | A | 10.0–11.0 | 0%–100% | Good | Spheres | 8–25 | Low initial magnesium concentration. |
| With Magnesium Acetate | B | 9.2–11.0 | 0%–100% | Gel formation for pH > 10.1 | Donuts (Toruses) | 10–25 | Mg Acetate increases the solid throughput. However, above pH = 10.1, a gel formation occurs and stops the filtration process. Stirring during precipitation. |
| With Magnesium Acetate | C | 9.6 | 9% | Good | Spheres | 4–5 | Below pH = 10.1, especially pH = 9.6, the samples filter very well. However, at that pH, it is impossible to prepare samples with higher than 15% magnesium hydroxide. Stirring during precipitation. |
| High Concentration Magnesium Acetate | D | 9.6 | 15%–50% | Acceptable, but not as good as Series B | Chunks (Agglomerates) |  | Mg Acetate concentration has been increased in order to prepare samples with magnesium hydroxide percentage as high as 50% and keep the pH at 9.6. Stirring during precipitation. | a Remaining material in the composition is hydromagnesite.

TABLE II

| pH | Hydromagnesite (%) | Magnesium hydroxide (%) | Filtration | Yield (g/10 mL) |
| --- | --- | --- | --- | --- |
| 10.61 | 39 | 61 | bad | 0.08 |
| 10.12 | 74 | 26 | good | 0.11 |
| 9.96 | 77 | 23 | good | 0.10 |
| 9.61 | 81 | 19 | very good | 0.10 |
| 9.24 | 85 | 15 | excellent | 0.10 |

TABLE III

| Paper Sample | Weight | Fillers |
|---|---|---|
| 1 | 15% | Example I filler |
|   | 15% | calcium carbonate |
| 2 | 30% | Example IV filler |
| 3 | 12% | Example VI filler |
|   | 15% | calcium carbonate |
| 4 | 12% | Example VII filler |
|   | 19% | calcium carbonate |
| 5 | 11.5% | Example VIII filler |
|   | 15.5% | calcium carbonate |
| 6 | 10.9% | Example IX filler |
|   | 16% | calcium carbonate |
| 7 | 11.5% | Example X filler |
|   | 14.5% | calcium carbonate |
| 8 | 11.5% | Example XI filler |
|   | 13.5% | calcium carbonate |
| 9 | 7.7% | Example XVII filler |
|   | 18.7% | calcium carbonate |
| 10 | 5.6% | Example XVII filler |
|    | 22.7% | calcium carbonate |
| 11 | 12.0% | Example XVII filler |
|    | 14.2% | calcium carbonate |
| 12 | 10.9% | Example XVII filler |
|    | 13.2% | calcium carbonate |
| 13 | 11.5% | Example XVII filler |
|    | 15.2% | calcium carbonate |
| 14 | 8.6% | Example XVII filler |
|    | 18.5% | calcium carbonate |
| 15 | 12.2% | Example XVI filler |
|    | 16.5% | calcium carbonate |
| 16 | 11.9% | Example XVI filler |
|    | 17.0% | calcium carbonate |
| 17 | 12.5% | Example XVI filler |
|    | 14.5% | calcium carbonate |
| 18 | 13.4% | Example XVI filler |
|    | 14.7% | calcium carbonate |
| 19 | 13.3% | Example XVI filler |
|    | 14.7% | calcium carbonate |
| 20 | 12.8% | Example XVI filler |
|    | 14.0% | calcium carbonate |

To measure the amount of sidestream smoke generated by cigarettes made as described in the foregoing examples, burning cigarettes were allowed to free burn while the sidestream smoke traveled through a photocell through which light was passed. The photocell detected the transmitted light intensity during the burning of 30 mm of the tobacco rod. The measured light intensity over the course of burning was determined and compared to the light intensity when no smoke was present in the photocell. An extinction coefficient ("EC") was calculated based on the Beer-Lambert Law.

The ECs of the cigarettes containing the fillers of the present invention were compared with the EC of a control cigarette. The results are reported in Table IV below as the percent reduction in the EC. The control was typically an 85 or 100 mm commercial cigarette having a 25 g/m² paper wrapper with a porosity of about 30 CORESTA units and a citrate salt of potassium and/or sodium sizing agent. Test cigarettes were made by hand at comparable packing densities using the same tobacco filler as the control. All test samples were of standard circumference (about 25 mm) and 85 to 100 mm in length including a 27 mm cellulose acetate filter.

Static Burn Time (SBT) also was determined for the cigarettes described in the foregoing. SBT is the amount of time it takes a cigarette to burn 40 mm under static conditions. In other words, it is the rate at which a cigarette smolders in the absence of drafts or puffing action. In Table IV below, SBT is expressed in terms of minutes, basis weight is in terms of grams per square meter, porosity is in CORESTA units, and sizing is in weight percent.

TABLE IV

| Paper Sample | Basis Weight, g/m² | Porosity | Sizing | SBT | Extinction Coefficient | % Reduction* |
|---|---|---|---|---|---|---|
| 1 | 45.4 | 3 | 8.9% $K_2$ succ | 11.9 | 0.19 (0.86) | 78 |
| 2 | 45.0 | 3.3 | 8.0% $K_2$ succ | 7.6 | 0.32 (0.77) | 58 |
| 3 | 47.5 | 5.5 | 4.7% $K_2$ succ | 9.4 | 0.20 (0.77) | 74 |
| 4 | 45.0 | 7.4 | 8.2% $K_2$ succ | 9.4 | 0.27 (0.77) | 65 |
| 5 | 45.3 | 3.2 | 6.5% $K_2$ succ | 9.9 | 0.22 (0.65) | 66 |
| 6 | 45.2 | 4.4 | 7.2% $K_2$ succ | 8.6 | 0.27 (0.75) | 64 |
| 7 | 45.2 | 6.9 | 7.0% $K_2$ succ | 8.1 | 0.24 (0.62) | 61 |
| 8 | 45.2 | 7.4 | 6.8% $K_2$ succ | 8.2 | 0.26 (0.62) | 58 |
| 9 | 49.0 | 5.6 | 4.7% $K_2$ succ | 7.3 | 0.40 (0.67) | 40 |
| 10 | 49.0 | 7.5 | 4.2% $K_2$ succ | 7.4 | 0.45 (0.67) | 33 |
| 11 | 49.0 | 6.6 | 6.0% $K_2$ succ | 8.1 | 0.31 (0.67) | 54 |
| 12 | 49.0 | 8.5 | 5.7% $K_2$ succ | 8.1 | 0.35 (0.67) | 48 |
| 13 | 49.0 | 5.6 | 5.0% $K_2$ succ | 8.5 | 0.25 (0.67) | 63 |
| 14 | 49.0 | 8.7 | 5.2% $K_2$ succ | 9.1 | 0.31 (0.67) | 54 |
| 15 | 46.2 | 6.1 | 6.1% $K_2$ succ | 6.8 | 0.41 (0.68) | 40 |
| 16 | 46.3 | 8.7 | 8.7% $K_2$ succ | 7.0 | 0.44 (0.68) | 35 |
| 17 | 46.3 | 5.0 | 5.0% $K_2$ succ | 7.5 | 0.48 (0.68) | 29 |
| 18 | 46.4 | 7.5 | 7.5% $K_2$ succ | 7.5 | 0.41 (0.68) | 40 |
| 19 | 46.3 | 6.1 | 6.1% $K_2$ succ | 8.4 | 0.34 (0.68) | 50 |
| 20 | 46.3 | 9.2 | 9.2% K2 succ | 7.6 | 0.43 (0.68) | 37 |

*Reduction based on extinction coefficient relative to a standard commercial control, having approximately the same mainstream smoke delivery, smoked on same day as the sample. Extinction coefficients for the respective controls are shown in parentheses.

As can be seen from the above results, cigarettes made with papers containing the compositions of the present invention provide significant sidestream smoke reduction relative to control cigarettes made with standard papers containing calcium carbonate as the sole filler. Upon subjective evaluation, the cigarettes described above were judged to be comparable in smoking qualities to standard commercial products. Additionally, the quality of the ash of these cigarettes made as described above was judged quite acceptable in appearance.

One skilled in the art will appreciate that the present invention may be practiced by other than the preferred embodiments which are presented above for purposes of illustration and not limitation, and the present invention is defined by the claims that follow.

What is claimed is:

1. A process for preparing an inorganic magnesium composition comprising the steps of:

(A) forming a first solution containing magnesium bicarbonate;

(B) heating the first solution to 45–550° to form a heated solution; and (C) adding an aqueous solution of a strong base to the heated solution and stirring the mixed solution for about 4–18 hours to form a precipitate.

2. A process according to claim 1, wherein step A comprises the step of mixing magnesium hydroxide, magnesium oxide, or a combination thereof, with water to form an aqueous suspension and reacting the suspension with carbon dioxide.

3. A process according to claim 2, further comprising the step of adding one or more water-soluble magnesium salts to the aqueous suspension.

4. A process according to claim 3, wherein the water-soluble magnesium salt is magnesium acetate.

5. A process according to claim 1, wherein step A comprises the step of reacting an aqueous suspension of at least one magnesium carbonate selected from the group consisting of hydromagnesite, nesquehonite, lansfordite, dypingite, and georgiosite with carbon dioxide.

6. A process according to claim 1, wherein step A comprises the step of reacting a water-soluble magnesium salt with an alkali metal bicarbonate in water to form an aqueous solution.

7. A process according to claim 1, wherein step C is conducted at a temperature of from 80 to 900° C.

8. A process according to claim 1, wherein step C is conducted at ambient temperature.

9. A process according to claim 1, wherein step (B) further comprises adding an aqueous solution of one or more water-soluble magnesium salts with the solution of step (A) prior to heating.

10. A process according to claim 9, wherein the water-soluble magnesium salt is magnesium acetate.

11. A process according to claim 1, wherein in step (C) the strong base is potassium hydroxide, sodium hydroxide, ammonium hydroxide, or a mixture thereof.

12. A process according to claim 1, wherein the strong base in step (C) is potassium hydroxide.

13. A process according to claim 1, wherein in step (C) the aqueous solution is added to give the resulting mixture a pH between about 9 and about 11.

14. A process according to claim 1, wherein in step (C) urea is added to the solution from step (B), prior to the addition of the strong base.

15. A process for preparing a magnesium carbonate hydroxide composition comprising the steps of:

(a) mixing hydromagnesite with water to form a suspension;

(b) reacting the suspension with carbon dioxide to form a first solution;

(c) treating the first solution with magnesium acetate to form a second solution; and (d) adding an aqueous basic solution to the second solution to form a precipitate.

16. A process according to claim 15, wherein in step (d) the aqueous basic solution is added to give a pH of between about 9 and about 11.

17. A process according to claim 15, wherein in step (d) the aqueous basic solution is selected from the group consisting of solutions of potassium hydroxide, sodium hydroxide, and ammonium hydroxide.

18. A process according to claim 15, wherein the aqueous basic solution at step (d) is a solution of potassium hydroxide.

19. A process according to claim 15, wherein step (d) further comprises adding urea prior to adding the aqueous basic solution.

20. An inorganic magnesium composition formed by first forming a first solution containing magnesium bicarbonate; then heating the first solution to 45–550° to form a heated solution; and finally adding an aqueous solution of a strong base to the heated solution and stirring the mixed solution for about 4–18 hours to form a precipitate.

21. A composition as claimed in claim 20, wherein the composition has a rosette morphology with agglomerate size of 1–20 μm.

22. A composition as claimed in claim 20, wherein hydromagnesite is present in an amount of from 99% to 10%.

23. A composition as claimed in claim 22, wherein the percentage of hydromagnesite in the composition is from 95% to 35%.

24. A composition as claimed in claim 22, wherein crystals of crystallized magnesium hydroxide are grown within leaves of hydromagnesite rosettes.

25. A composition as claimed in claim 22, wherein the composition is present as particles of hydromagnesite-magnesium hydroxide composition in the shape of spheres.

26. A composition as claimed in claim 22, wherein the composition is present as particles of hydromagnesite-magnesium hydroxide in the shape of toruses.

27. A composition as claimed in claim 22, wherein the composition is present as particles of hydromagnesite-magnesium hydroxide agglomerates.

28. A filler for use in a paper wrapper for a smoking article comprising a magnesium composition formed by first forming a first solution containing magnesium bicarbonate; then heating the first solution to 45–550° to form a heated solution; and finally adding an aqueous solution of a strong base to the heated solution and stirring the mixed solution for about 4–18 hours to form a precipitate.

29. A filler as claimed in claim 28, further comprising up to about 60% by weight of at least one compound selected from the group consisting of inorganic oxides, inorganic hydroxides, and inorganic carbonates.

30. A filler as claimed in claim 29, wherein the compound is selected from the group consisting of magnesium oxide, magnesium hydroxide, magnesite, calcium carbonate, hydromagnesite, and titanium dioxide.

31. A paper wrapper for a smoking article comprising:

(a) plant fibers; and (b) a filler formed by first forming a first solution containing magnesium bicarbonate; then heating the first solution to 45–550° to form a heated solution; and finally adding an aqueous solution of a strong base to the heated solution and stirring the mixed solution for about 4–18 hours to form a precipitate.

32. A paper wrapper according to claim 31, wherein the paper wrapper has between about 2% to about 15% of at least one alkali metal salt by weight based on the total weight of the paper wrapper.

33. A paper wrapper according to claim 32, wherein the alkali metal salt is at least one member selected from the group consisting of sodium fumarate, potassium citrate, sodium citrate, potassium dihydrogen phosphate, and potassium succinate.

34. A paper wrapper according to claim 32, wherein the paper wrapper has a basis weight of between about 15 g/m2 to about 75 g/m2; and a porosity of between about 2 CORESTA units to about 15 CORESTA units.

35. A paper wrapper according to claim 32, wherein the paper wrapper has a basis weight of between about 35 g/m2 to about 65 g/m2; and a porosity of between about 4 CORESTA units to about 8 CORESTA units.

36. A paper wrapper according to claim 32, wherein the paper wrapper contains from about 5% to about 45% of the filler by weight based on the total weight of the paper wrapper.

37. A paper wrapper for a smoking article comprising:
(a) plant fibers;
(b) a filler containing
 (1) at least about 40% by weight of a precipitate made by mixing hydromagnesite with water to form a suspension, reacting the suspension with carbon dioxide to form a solution, and adding an aqueous basic solution to the solution to form the precipitate, and
 (2) up to about 60% by weight of an admixture of any of magnesium oxide, hydromagnesite, magnesium hydroxide, magnesite, calcium carbonate, calcium hydroxide and titanium dioxide; and
(c) between about 2% to about 15% of an alkali metal salt selected from the group consisting of sodium fumarate, potassium citrate, sodium citrate, potassium dihydrogen phosphate, and potassium succinate;

wherein the paper wrapper has a basis weight of between about 15 g/m2 to about 75 g/m2 and a porosity of between about 2 CORESTA units to about 15 CORESTA units.

38. A smoking article having reduced sidestream smoke comprising:

tobacco and a paper wrapper containing
 plant fibers and
 a filler formed by first forming a first solution containing magnesium bicarbonate; then heating the first solution to 45–550° to form a heated solution; and finally adding an aqueous solution of a strong base to the heated solution and stirring the mixed solution for about 4–18 hours to form a precipitate.

* * * * *